Patented Feb. 1, 1927.

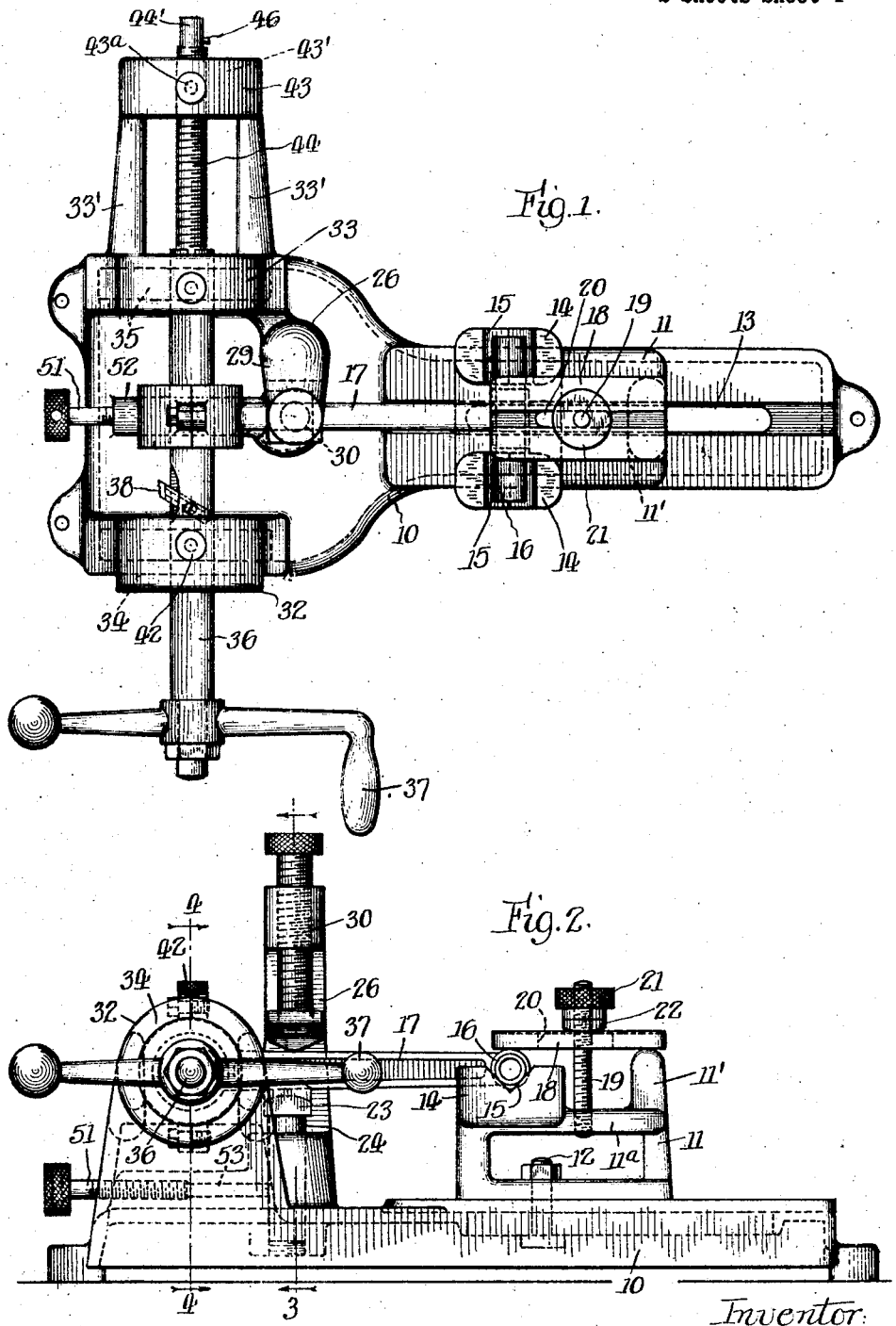

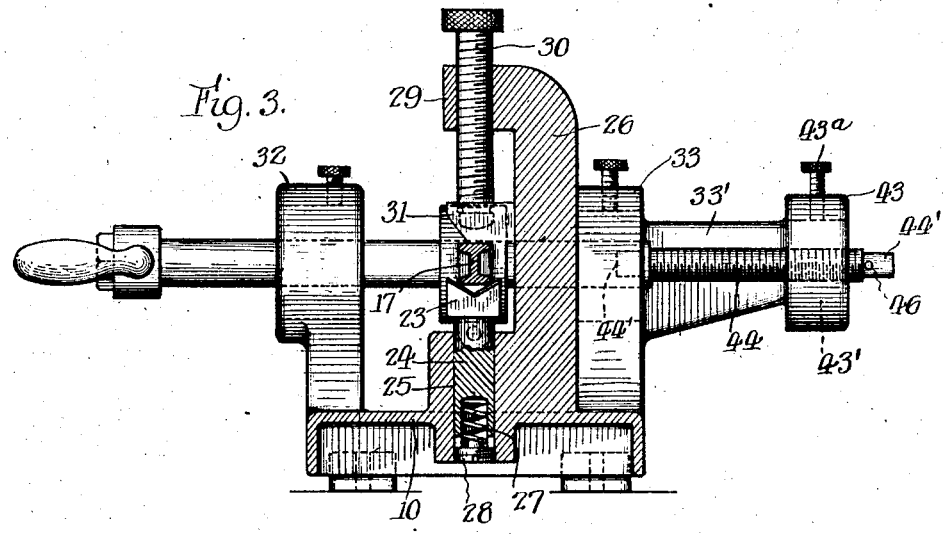

1,616,052

UNITED STATES PATENT OFFICE.

OSKAR KYLIN, OF ELKHART, INDIANA, ASSIGNOR TO FOSTER-JOHNSON REAMER COMPANY, OF ELKHART, INDIANA, A CORPORATION OF INDIANA.

CONNECTING-ROD-REBORING MACHINE.

Application filed November 8, 1924. Serial No. 748,531.

This invention relates to machines for reboring the bushings of connecting rods of pistons and the like, and has for its main object to provide an improved and more rapidly acting means for effecting the reboring of small motor-connecting rods, particularly those used in automobile engines.

Another object is to provide a machine whereby the bearing bushing of the connecting rod can be easily and quickly rebored without the necessity of removing the bushing from its seat in the crank pin bearing of the rod.

Other objects are to provide improved means for supporting and centering the connecting rod, and to provide a boring bar feed mechanism by which the cutting tool can be quickly returned to starting position.

Other objects and attendant advantages of the invention will be apparent to persons familiar with the art from the following detailed description, taken in connection with the accompanying drawing wherein I have illustrated a practical and approved embodiment of the invention, and in which—

Fig. 1 is a top plan view of the machine;

Fig. 2 is a side elevation thereof, viewed from the bottom of Fig. 1;

Fig. 3 is a vertical section on the line 3—3 of Fig. 2;

Fig. 4 is a vertical section in the plane of the line 4—4 of Fig. 2, but with the boring tool removed and replaced by a centering device preliminarily used to center the connecting rod for the subsequent reboring operation;

Fig. 5 is a detail view partly in longitudinal section and partly in elevation showing the means for coupling the boring tool and its feed screw;

Fig. 6 is a cross-section on the line 6—6 of Fig. 5; and

Fig. 7 is a view similar to Fig. 5, showing the parts in coupled relation.

Referring to the drawings, 10 designates the base of the machine, on which is slidably mounted a rest piece 11 adjustably secured to the base by a bolt 12 passing through the bottom of the rest piece and a longitudinal slot 13 in the base. Mounted on the rest piece 11 are a pair of saddle blocks 14 formed in their upper surfaces with alined transversely disposed V-shaped notches 15, the sides of which are preferably rectangular. These notches serve to seat and support the wrist-pin 16 of a piston connecting rod 17 by which the rod is swiveled in the piston. The pin 16 is firmly secured in place by a clamp plate 18 resting at one end on top of the pin bearing of the connecting rod 17 and at its other end on an upstanding projection 11' of the rest 11. The clamp plate 18 is screwed down on the work by a bolt 19 at its lower end screwed into the upper horizontal wall 11ª of the rest 11 and passing through a longitudinal slot 20 in the clamp plate 18, and tensioned by a nut 21 and washer 22, this latter formed with a convex lower surface resting on the clamp plate 18, whereby to accommodate the bolt and clamp plate to varying diameters of bearings in the seats 15.

The connecting rod 7 at a point a short distance inwardly of its crank pin bearing is rested upon a seat or saddle 23 that is mounted on the upper end of a round stem 24, this latter being mounted to slide vertically in a hole bearing 25 formed in the base of an upright frame member 26 on and preferably integral with the base 10. The stem 24 is bored at its lower end to house a thrust spring 27 that is footed and centered on a threaded cap 28 screwed into the lower end of the bearing 25. On the upper end of the frame member 26 is an overhanging horizontal arm 29, through which extends a threaded rod 30, on the lower end of which latter is swiveled a clamp block 31. The spring 27 and screw 30 oppose each other, so that the body of the connecting rod 17 is securely gripped between the seat 23 and the clamp block 31, and is adjusted as to height by merely turning the screw 30 up or down.

On the machine bed 10, just beyond the rod supporting and clamping means last-described are a pair of pillow blocks 32 and 33 carrying bearings 34 and 35 respectively for a boring bar 36; this latter equipped on one end with a crank handle 37 for turning the same and, between its bearings, with the usual cutter 38. When the connecting rod 17 is properly positioned to be rebored, the crank pin bearing and its bushing are axially coincident with the boring bar 36. This accurate positioning of the crank pin bearing and its bushing is easily and quickly effected by adjusting the rest 11 lengthwise of the base until the centering in a horizontal direction is obtained, and then adjusting the screw 30 to secure accurate centering in a vertical direction. However, to insure more accurate results than are obtainable by the eye and skill of the operator, I have equipped the machine with a mechanical centering device shown in Fig. 4; this consisting of a mandrel 39 of a size to accurately fit the opening in the pillow block 32 which supports the boring bar bearing 34. This mandrel 39 has a conical forward end or nose 40, and a knurled rear end or knob 41 for turning the same. The connecting rod having been roughly adjusted to position, and the boring bar 36 and its bearing or bushing 34 having been removed, the mandrel 39 is advanced through the block 32 until the connecting rod bearing to be rebored is entered and centered by the nose 40 of the mandrel, as clearly shown in Fig. 4. The centering mandrel 39 is then temporarily secured rigidly in place by the bearing binding screw 42, and the proper adjustments of the rear and front clamps are then made to insure the rigid and strong support of the connecting rod in the exact position established by the centering device 39.

On the pillow block 33 are a pair of rearwardly extending arms 33' supporting at their outer ends a cross-head 43 having a transverse hole therein that is in coaxial alinement with the boring bar 36 and seats a nut 43' secured in place by a set screw 43ª, which nut 43' is engaged with a boring bar feed screw 44. This feed screw is detachably coupled at either end thereof to the end of the boring bar 36 preferably by substantially the means shown in Figs. 5, 6 and 7. In the end of the boring bar 36 is a central bore 45 of a diameter to fit the smooth unthreaded end portions 44' of the feed screw 44. In each end portion 44' of the feed screw 44 is a radial coupling pin 46. In the bore 45 is a counter-sunk annular groove 47 that receives the coupling pin 46. Between the groove 47 and the extreme end of the boring bar 36 are a pair of diametrically opposed slots 48, through either of which the pin 46 can be entered into the annular groove 47. The rotary movement of the boring bar is transmitted to the feed screw by a radial pin 49 mounted in the boring bar and extending across the path of the pin 46 in the groove or channel 47. A spring 50 seated in a reduced extension 45' of the bore 45 exerts a continuous thrust against the end of the feed screw and thereby prevents any lost motion or backlash between the feed screw and the boring bar which would have a deleterious effect on the smoothness of the cut.

The advantage of making the feed screw 44 so that it can be coupled at either end to the boring bar, is that when a cut is finished the screw 44 and nut 43' can be withdrawn, turned end for end, and recoupled to the boring bar. This saves considerable time by making is unnecessary to return the cutting tool to its starting position by turning the boring bar backwards, as would otherwise have to be done.

The intermediate supporting saddle 23, when adjusted to the proper height by the screw 30 is secured rigidly in position by a horizontal locking screw 51 threading into a bearing 52 on the base 10 and abutting against the outer end of a rod 53 that is slidably fitted in the bearing 52 and at its inner end abuts against the stem or shank 24 of the connecting rod saddle 23.

While I have herein shown and described one physical embodiment of the invention which in practice has been found to satisfactorily effectuate the stated purposes and objects thereof, it is manifest that the details of structure and organization herein described and shown may be variously modified and changed within the principle of the invention and without sacrificing any of the advantages thereof. Hence, I reserve all such variations and modifications as fall within the spirit and purview of the appended claims.

I claim—

1. In a machine for reboring connecting rods, the combination of a frame, means for supporting and clamping the wrist pin of the rod, means for centering the connecting rod bearing, and means for holding the connecting rod in the position fixed by said centering means; said holding means comprising an upwardly spring-pressed saddle, a vertically adjustable clamp mounted above said saddle, and means for locking said saddle in adjusted position.

2. In a machine for reboring connecting rods, the combination of a frame, a boring bar and feed mechanism therefor mounted in said frame, a support and clamp for the wrist pin of the rod adjustable on said frame toward and from the boring bar, and means for holding the connecting rod at a point thereon adjacent to the bearing to be rebored, said holding means comprising an upwardly spring-pressed saddle having a V-shaped seat for the connecting rod, a clamp block engageable with the upper side of the connecting rod, a clamp block adjusting screw engaged with said clamp block, and means for locking said saddle in adjusted position.

3. In a machine for reboring connecting rods, the combination of a frame, a boring bar and feed mechanism therefor mounted in said frame, a wrist pin support comprising a rest piece adjustable on said frame toward and from the boring bar, a pair of spaced saddle blocks on said rest piece formed with alined V-shaped notches in their upper sides to seat the wrist pin, and means for clamping said wrist pin in said notches; and means for holding the connecting rod at a point thereon adjacent to the bearing to be rebored, said holding means comprising an upwardly spring-pressed saddle having a V-shaped seat for the connecting rod, a clamp block engageable with the upper side of the connecting rod, a vertically disposed clamp block adjusting screw swiveled at its lower end to said clamp block, and means for locking said saddle in adjusted position.

4. In a machine of the character described, the combination of a frame, a boring bar journaled therein, a feed screw mounted in said frame and removably coupled to one end of said boring bar, co-operating means on said boring bar and feed screw for transmitting rotary movement of the former to the latter, and a thrust spring between the opposed ends of said boring bar and feed screw for eliminating lost motion in a lengthwise direction between said boring bar and feed screw.

5. In a machine of the character described, the combination of a frame, a boring bar journaled therein and formed with a bore in one end thereof, an annular groove in the wall of said bore, and a stop pin intersecting said groove; a stationary nut mounted in said frame, a feed screw engaged with said nut and at one end entering the bore of said boring bar, a radial pin in said feed screw engaged in said annular groove; and a thrust spring between the bottom of said bore and the opposed end of said feed screw serving to prevent endwise play between said boring bar and feed screw.

OSKAR KYLIN.